US010733822B1

(12) United States Patent
Roberts et al.

(10) Patent No.: US 10,733,822 B1
(45) Date of Patent: Aug. 4, 2020

(54) CONNECTED OUTDOOR GATE LOCK

(71) Applicant: Alarm.com Incorporated, Tysons, VA (US)

(72) Inventors: Aaron Lee Roberts, Centreville, VA (US); Charles Richard Alpert, Snoqualmie, WA (US)

(73) Assignee: Alarm.com Incorporated, Tysons, VA (US)

( * ) Notice: Subject to any disclaimer, the term of this patent is extended or adjusted under 35 U.S.C. 154(b) by 73 days.

(21) Appl. No.: 16/012,245

(22) Filed: Jun. 19, 2018

Related U.S. Application Data

(60) Provisional application No. 62/523,819, filed on Jun. 23, 2017.

(51) Int. Cl.
*G07C 9/00* (2020.01)
*G05B 19/4155* (2006.01)
*E05B 47/00* (2006.01)
*E05B 65/00* (2006.01)

(52) U.S. Cl.
CPC .......... *G07C 9/00896* (2013.01); *E05B 47/00* (2013.01); *G05B 19/4155* (2013.01); *E05B 47/0001* (2013.01); *E05B 65/0007* (2013.01); *E05B 2047/0069* (2013.01); *G05B 2219/45242* (2013.01)

(58) Field of Classification Search
CPC . G07C 9/00896; E05B 47/00; E05B 47/0001; E05B 2047/0069; E05B 65/0007; G05B 19/4155; G05B 2219/45242
See application file for complete search history.

(56) References Cited

U.S. PATENT DOCUMENTS

| 4,464,651 | A | 8/1984 | Duhame | |
|---|---|---|---|---|
| 9,804,596 | B1* | 10/2017 | Slavin | G05D 1/0022 |
| 2011/0050899 | A1* | 3/2011 | Merkel | G08B 13/19602 348/143 |
| 2015/0160636 | A1 | 6/2015 | McCarthy et al. | |
| 2015/0330140 | A1* | 11/2015 | Kincaid | E06B 7/28 324/207.12 |
| 2016/0255807 | A1* | 9/2016 | Noblitt | E06B 7/32 |
| 2016/0316363 | A1* | 10/2016 | Li | H04W 12/04 |
| 2018/0303064 | A1* | 10/2018 | Nowling | A01K 15/021 |

* cited by examiner

*Primary Examiner* — Thomas C Lee
*Assistant Examiner* — Charles Cai
(74) *Attorney, Agent, or Firm* — Fish & Richardson P.C.

(57) ABSTRACT

Methods, systems, and apparatus, including computer programs encoded on a computer storage medium, for interaction with a connected outdoor gate lock. The methods, systems, and apparatus include actions of detecting, by a control unit, that a gate of a fence that encloses a building has opened, in response to detecting that the gate of the fence that encloses the building has opened, determining, by the control unit, whether (i) a pet is in the building and (ii) a pet door of the building is unlocked, and in response to determining (i) that the pet is in the building and (ii) that the pet door of the building is unlocked, locking, by the control unit, the pet door of the building.

18 Claims, 6 Drawing Sheets

CONNECTED OUTDOOR GATE LOCK

CROSS-REFERENCE TO RELATED APPLICATIONS

This application claims the benefit of the U.S. Provisional Patent Application No. 62/523,819 filed Jun. 23, 2017 and entitled "CONNECTED OUTDOOR GATE LOCK," which is incorporated herein by reference in its entirety.

TECHNICAL FIELD

This disclosure relates to property monitoring technology.

BACKGROUND

Many people equip homes and businesses with monitoring systems to provide increased security for their homes and businesses.

SUMMARY

Techniques are described for monitoring technology with a connected outdoor gate lock.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Outdoor gates may control access to outdoor areas of a property. For example, a six foot high wooden fence may go around the edge of a property and the fence may include one or more gates that may be opened and closed. A connected outdoor gate lock may detect when a gate is unlocked, locked, opened, or closed. Additionally or alternatively, the gate lock may lock or unlock the gate.

A connected outdoor gate lock may enable additional functionality to users of a monitoring system. For example, the monitoring system may enable a user to lock or unlock a gate without the user needing to physically manipulate the gate. In another example, the monitoring system may notify a user when a gate is unlocked or opened. In yet another example, the monitoring system may lock a pet door of a house when a gate is opened and the pet is inside the house so that the pet does not run away.

There are various types of gates. For example, some gates swing inwards, some gates swing outwards, some gates are three foot high, some gates are five foot high, some gates are ten feet from a building, some gates are fifty feet from a building, etc. A connected outdoor gate lock may be configured to work with gates of different types.

Figure 1:
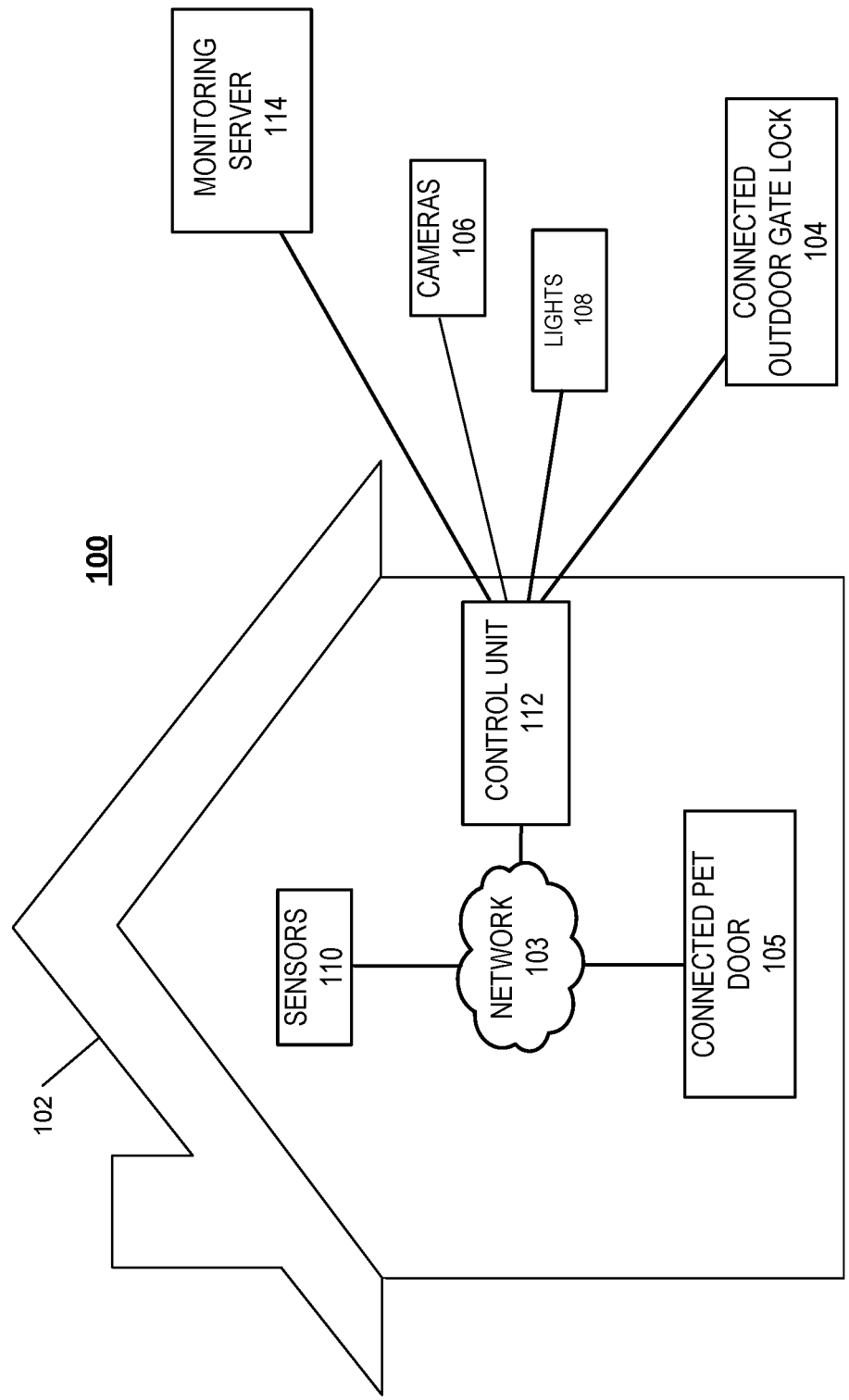
FIG. 1 illustrates an example of a monitoring system with a connected outdoor gate lock.

FIG. 1 illustrates an example of a monitoring system 100 with a connected outdoor gate lock 104. As shown in FIG. 1, a property 102 (e.g. a home) of a user is monitored by an in-home monitoring system (e.g. in-home security system) that includes components that are fixed within the property 102 (components both indoors and outdoors). The monitoring system 100 may include a control unit 112, one or more sensors 110, one or more cameras 106, one or more lights 108, the connected outdoor gate lock 104, and a connected pet door 105. The one or more cameras 106, the one or more lights 108, and the connected outdoor gate lock 104 are shown outdoors and the one or more sensors 110, the connected pet door 105, and the control unit 112 are shown indoors.

The connected outdoor gate lock 104 may include a locking mechanism that locks or unlocks the gate. The locking mechanism may include a deadbolt and a deadbolt keep. For example, the connected outdoor gate lock 104 may include a deadbolt that is attached to a portion of the gate that swings open and a deadbolt keep that is attached to a portion of the gate that is fixed. In another example, the connected outdoor gate lock 104 may include a deadbolt that is attached to a portion of the gate that is fixed and a deadbolt keep that is attached to a portion of the gate that swings open. In another implementation, the locking mechanism may be an electromagnet that magnetically prevents a gate from opening when powered and allows a gate to open when unpowered.

The locking mechanism may be controlled by the control unit 112. For example, the connected outdoor gate lock 104 may receive an instruction from the control unit 112 to lock the gate and, in response, actuate a motor in the locking mechanism that extends the deadbolt into the deadbolt keep. In another example, the connected outdoor gate lock 104 may receive an instruction from the control unit 112 to unlock the gate and, in response, actuate a motor in the locking mechanism that withdraws the deadbolt from the deadbolt keep.

The locking mechanism may additionally be physically controlled. For example, the connected outdoor gate lock 104 may include a switch that a user may physically slide to extend the deadbolt into a deadbolt keep to lock the gate. In another example, the connected outdoor gate lock 104 may include a switch that a user may physically slide to withdraw the deadbolt from a deadbolt keep to unlock the gate. In some implementations, the connected outdoor gate lock 104 may prevent itself from being physically unlocked. For example, the connected outdoor gate lock 104 may lock itself and, at night, prevent itself from being physically unlocked.

The connected outdoor gate lock 104 may prevent itself from being physically unlocked by including a motor that moves a block into a position that blocks the switch from being physically moved. The connected outdoor gate lock 104 may later move the block out of the position that blocks the switch to enable the lock 104 to be physically unlocked.

The connected outdoor gate lock 104 may detect when a gate is opened or closed. The connected outdoor gate lock 104 may include a sensor that detects when the deadbolt is adjacent to the deadbolt keep and detect when a gate is opened or closed using the sensor. For example, the connected outdoor gate lock 104 may include a magnetic sensor in a portion that includes the deadbolt and may include a magnet in a portion that includes the deadbolt keep. Accordingly, when the magnetic sensor detects a magnetic field corresponding to when the magnetic sensor is adjacent to the magnet, the connected outdoor gate lock 104 determines that the gate is closed, and when the magnetic sensor does not detect a magnetic field corresponding to when the magnetic sensor is adjacent to the magnet, the connected outdoor gate lock 104 determines that the gate is open. In another example, the connected outdoor gate lock 104 may include a magnetic sensor in a portion that includes the deadbolt keep and may include a magnet in a portion that includes the deadbolt, and similarly determine whether the gate is closed based on the magnetic field sensed by the magnetic sensor.

The connected outdoor gate lock 104 may monitor a state of the connected outdoor gate lock 104. States may includes one or more of, open, unlocked and closed, locked and physically unlockable, locked and not physically unlockable. In some implementations, the connected outdoor gate lock 104 may only consider a gate locked when the gate is closed. For example, if a user physically extends a deadbolt of the connected outdoor gate lock 104 while the gate is open, the connected outdoor gate lock 104 will detect that the gate is open and consider that gate as open and unlocked. In some implementations, the connected outdoor gate lock 104 may not lock itself when the gate is opened. For example, if the connected outdoor gate lock 104 receives an instruction from the control unit 112 to lock but the connected outdoor gate lock 104 determines that the gate is open, the connected outdoor gate lock 104 may not actuate a motor to extend a deadbolt into a keep and instead provide a response to the control unit 112 that indicates that the lock 104 cannot be locked because the gate is open.

The connected outdoor gate lock 104 may provide its state to the control unit 112. For example, the lock 104 may indicate to the control unit 112 that the lock is unlocked. The lock 104 may provide its state any time that the connected outdoor gate lock 104 detects that a state has been changed. For example, the lock 104 may provide a new state within one second of detecting a change in a state. Additionally or alternatively, the lock 104 may provide an update in response to a request from the control unit 112. For example, the control unit 112 may request a state and, in response, the lock 104 may provide the current state to the control unit 112.

The connected outdoor gate lock 104 may additionally or alternatively may accept a short-range signal that enables the lock 104 to unlock. For example, the lock 104 may be set in a state of locked and not physically unlockable, detect that a key fob is positioned proximate to a radio-frequency identification (RFID) sensor of the lock 104 and the key fob includes a valid token for unlocking the lock 104. In response, the lock 104 may either unlock the lock 104, toggle a state of the lock 104 between physically unlockable and not physically unlockable, or change a state of the lock 104 from not physically unlockable to physically unlockable for a few seconds.

In some implementations, the lock 104 may additionally or alternatively include a keypad for a user to enter a key code for unlocking the lock 104, toggling a state of the lock 104 between physically unlockable and not physically unlockable, or changing a state of the lock 104 from not physically unlockable to physically unlockable for a few seconds. The RFID sensor or keypad may be mounted on a gate on the opposite side of the gate that the deadbolt portion 230 is mounted. For example, the deadbolt portion 230 may be mounted on an interior side of a gate so that it is not accessible from the outside and the RFID sensor or keypad may be mounted on an outside of the gate and wired or wirelessly in communication with one another. The RFID sensor or keypad may additionally be coupled to the power source 240 or the deadbolt portion 230 to draw power.

The connected outdoor gate lock 104 may include a power source. For example, the lock 104 may include a battery that is internal to a portion that includes a deadbolt, internal to a portion that includes a deadbolt keep, or external to both a portion that includes the deadbolt and the deadbolt keep. The power source may include one or more of a battery, a solar panel, a transducer, or a wire to power from a home.

As described above, the control unit 112 may receive states from the connected outdoor gate lock 104 and provide instructions for the lock 104 to lock, unlock, become physically unlockable, and become not physically unlockable. In some implementations, the monitoring system 100 may provide notifications to a user based on the states the control unit 112 receives from the lock 104. For example, the monitoring system 100 may provide an alert to a mobile computing device of a user every time a state of a lock 104 changes. In another example, the monitoring system may provide an alert to a mobile computing device when a notification rule defined by a user is satisfied where a condition of a rule is based on a state of the lock 104.

The control unit 112 may also perform other actions based on states received from the lock 104. For example, the control unit 112 may lock a connected pet door 105 if a lock 104 indicates that a gate is open or unlocked. In another example, the control unit 112 may detect that a pet has been let into a yard and that the lock 104 indicates the gate is open and, in response, provide a user a notification that the gate is open. The notification may be through one or more of speakers in the home saying "Your pet is now in the yard and your gate is open," flashing lights, or a notification of "Your pet is now in the yard and your gate is open" displayed on a mobile computing device of the user. The control unit 112 may determine locations of pets based on one or more of analyzing videos of pets captured by the one or more cameras 106, location trackers attached to pets, or some other technique.

In some implementations, the control unit 112 may take into account whether a home has multiple pets in taking actions based on the lock 104. For example, the control unit may determine that while the lock 104 indicates that the gate has just been opened and a pet is indoors, another pet is already outdoors in a yard inside the fence so instead of locking the pet door 105, the pet door 105 should stay unlocked so the pet already outdoors can re-enter the home. In the example, once all pets in the yard have re-entered the home and the lock 104 has not indicated that the gate has been closed, the control unit 112 may then lock the connect pet door 105.

In still another example, the control unit 112 may use the sensors 110 to detect when a user goes to sleep and, in response, lock the lock 104 so that the lock 104 can not be physically unlocked. Similarly, the control unit 112 may use the sensors 110 to detect when a user wakes up and, in response, unlock the lock 104 and/or change the state of the lock 104 so it can be physically unlocked.

In yet another example, the control unit 112 may determine that the time is 11 PM and a predefined rule of locking the lock 104 at 11 PM should be triggered and, in response, either lock the lock 104 so that it cannot be physically unlocked or, if determining that the gate is open, notify a user that the lock 104 cannot be locked because the gate is open. Similarly, the control unit 112 may determine that the time is 7 AM and a predefined rule of unlocking the lock 104 at 7 AM should be triggered and, in response, unlock the lock 104.

In still another example, the control unit 112 may determine that the lock 104 has been unlocked or has physically been attempted to be unlocked when it is not physically unlocked and, in response, turn on the one more lights 108 near the lock 104 and/or provide a video stream of the gate from the one or more cameras 106.

While the control unit 112 is described as performing various functionality, as described above in FIG. 1 and further below in FIG. 3, the monitoring server 114 may perform various functions described for the control unit 112. For example, the control unit 112 may provide states of the lock 104 to the monitoring server 114 to determine actions in the property 102 to be triggered, and the monitoring server 114 may transmit those actions for the control unit 112 to then provide corresponding instructions to the appropriate devices within the property 102.

FIGS. 2A-D illustrate examples of a connected outdoor gate lock. In the diagram 200 of FIG. 2A, the connected outdoor gate lock includes a deadbolt keep 210, a mounting plate 220, a deadbolt portion 230, and a power source 240. The deadbolt keep 210 includes two top T-rails 212A, 212B so that a top of the deadbolt keep 210 may be slid into the mounting plate. The deadbolt keep 210 includes two bottom T-rail 212C (second bottom T-rail obscured by deadbolt 232) so that a bottom of the deadbolt keep 210 may be slide into the mounting plate 220. The deadbolt keep 210 includes four screw holes so that screws may be screwed into the deadbolt keep 210 to stop the deadbolt keep 210 from sliding off the T-rails of the mounting plate 220. The deadbolt keep 210 may include a magnetic portion of a contact sensor.

The mounting plate 220 includes two T-rails 222A, 222B for coupling to corresponding T-rails of the deadbolt keep 210, and four mounting holes 224A-D for mounting the mounting plate 220 to a gate with screws.

The deadbolt portion 230 includes a deadbolt 232, a switch 234, and four mounting holes 236A, 236B (two others obscured). The deadbolt 232 and deadbolt keep 210 may be shaped so that the deadbolt 232 can be moved to extend into the deadbolt keep 210. The switch 234 may be a piece that is shaped to be physically moved by a person to extend or withdraw the deadbolt 232. The mounting holes 236, 236C are for mounting the deadbolt portion 230 to a gate with screws. The deadbolt portion 230 may include a magnetic sensing portion of a contact sensor.

The power source 240 includes a housing for a battery and multiple mounting holes for mounting the power source 240 to a gate.

Figure 2A:
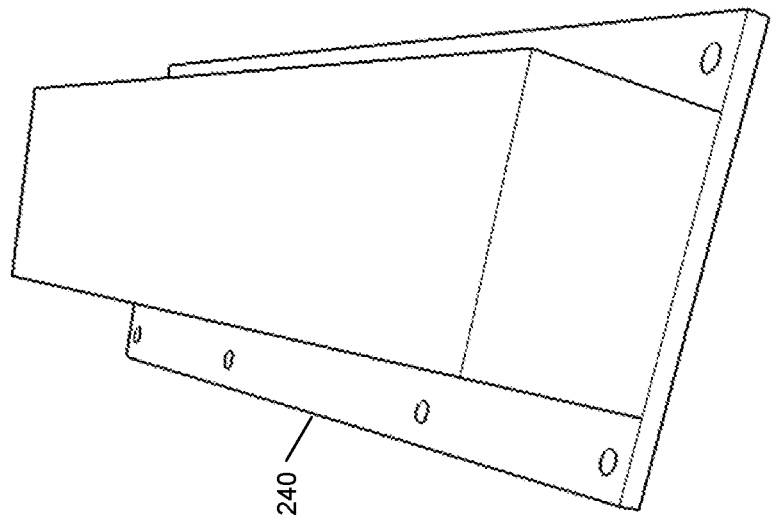
FIGS. 2A-D illustrate examples of a connected outdoor gate lock.
Figure 2A:
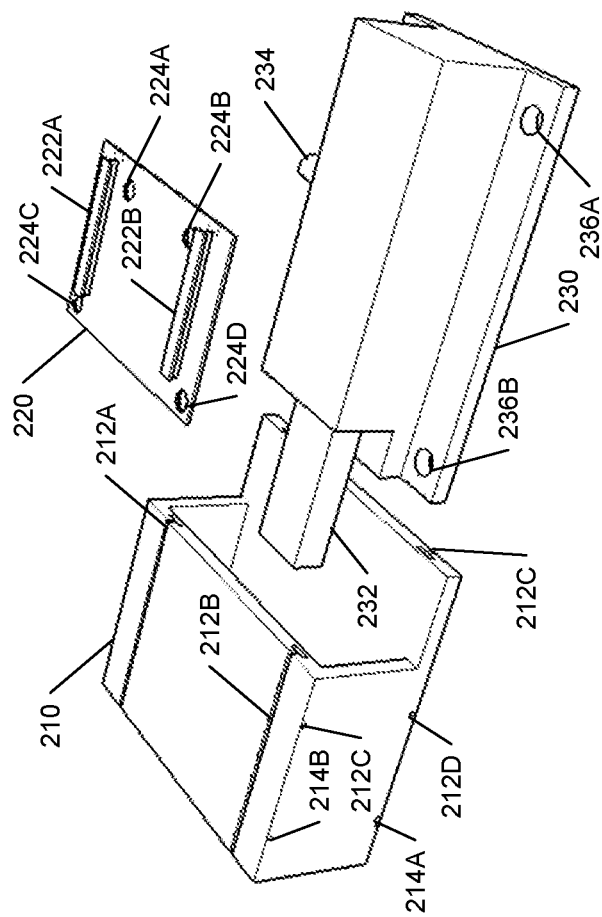
Figure 2B:
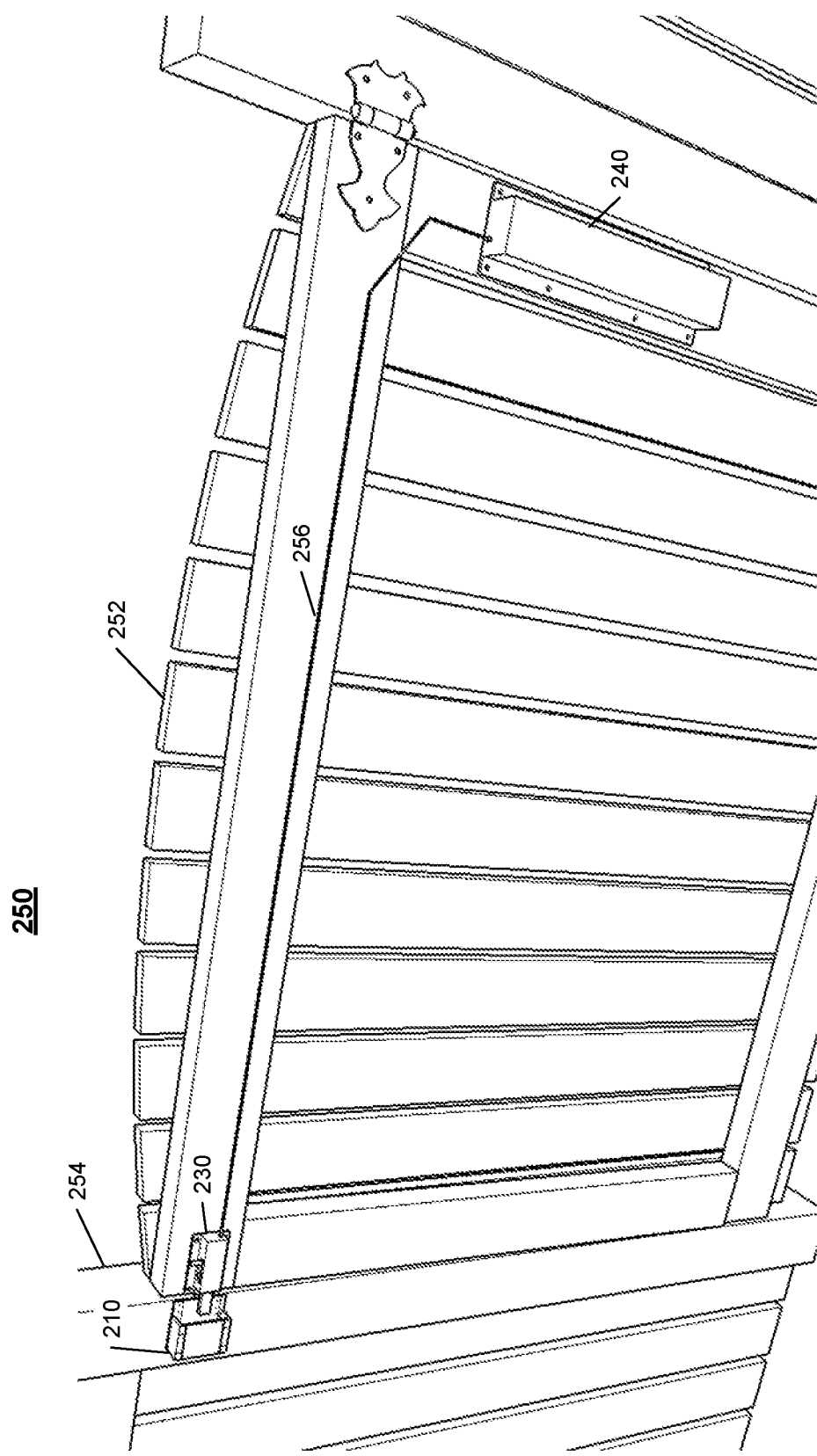

FIG. 2B illustrates an example of a connected outdoor gate lock. In the diagram 250 of FIG. 2B, the deadbolt keep 210 is mounted on a side of a gate that is fixed 254 and the deadbolt portion 230 is mounted on a portion of the gate that swings inward 252. The deadbolt portion 230 has a power wire 256 that extends to the power source 240. In FIG. 2B, the deadbolt of the deadbolt portion 230 is shown as not extending into the deadbolt keep 210 so the lock is unlocked.

Figure 2C:
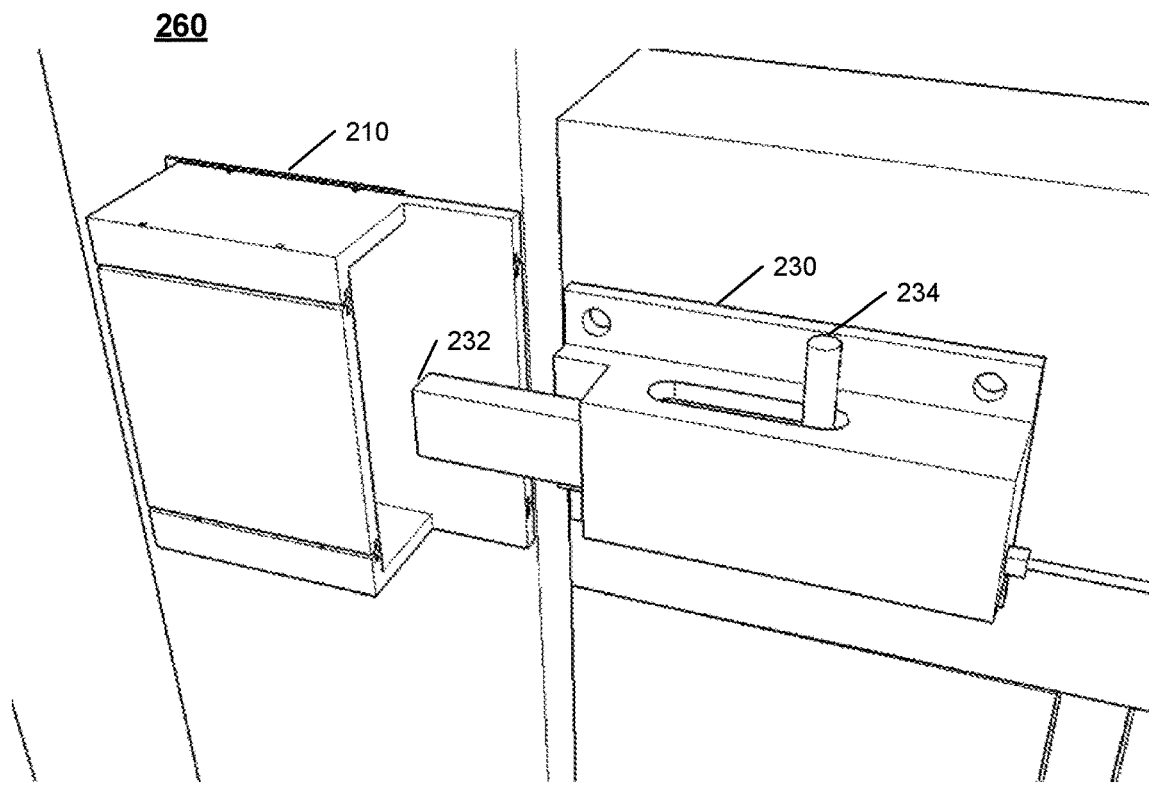

FIG. 2C illustrates an example of a connected outdoor gate lock. In the diagram 260 of FIG. 2C, the deadbolt keep 210 is mounted to a gate by the bottom of the deadbolt keep 210 so that the gate swings inwards when unlocked, toward a view point in the diagram 260. FIG. 2C shows the connected outdoor gate lock in an unlocked position, reflected in that the deadbolt 232 does not extend into the deadbolt keep 210 and the switch 234 is in a position where the switch 234 may be moved to the left to physically extend the deadbolt 232. In FIG. 2C, the deadbolt of the deadbolt portion 230 is shown as not extending into the deadbolt keep 210 so the lock is unlocked.

Figure 2D:
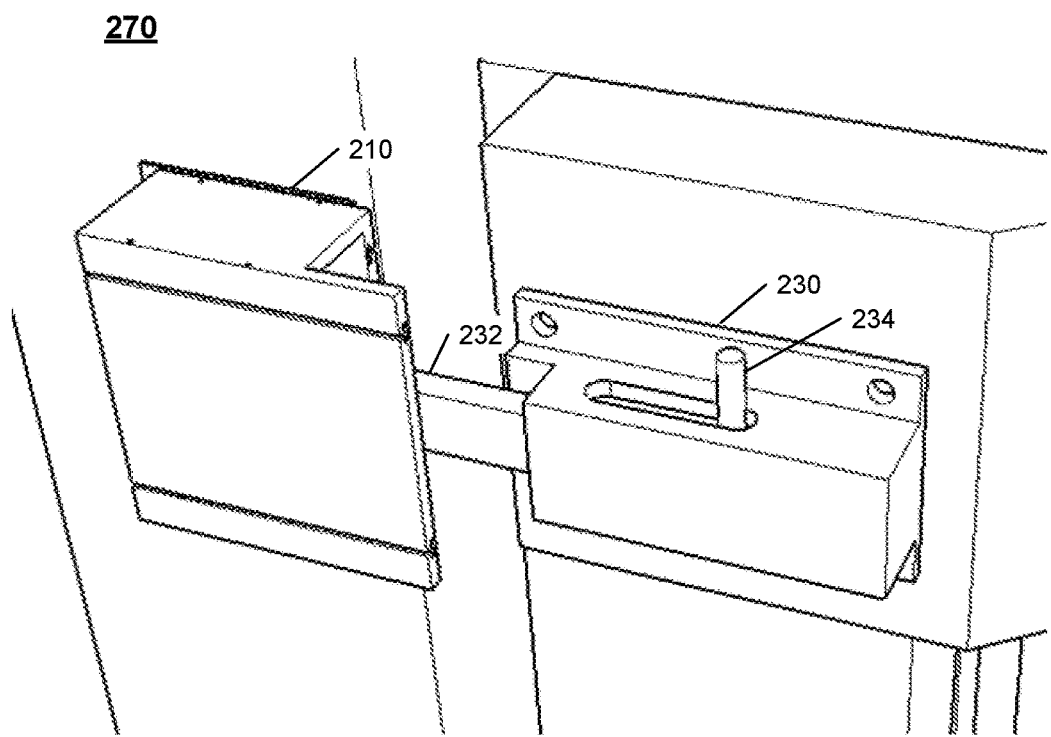

FIG. 2D illustrates an example of a connected outdoor gate lock. In the diagram 270 of FIG. 2D, the deadbolt keep 210 is mounted to a gate by the top of the deadbolt keep 210 so that the gate swings outwards when unlocked, away from a view point in the diagram 260. FIG. 2D shows the connected outdoor gate lock in an unlocked position as the switch 234 is in a position where the switch 234 may be moved to the left to physically extend the deadbolt 232.

Figure 3:
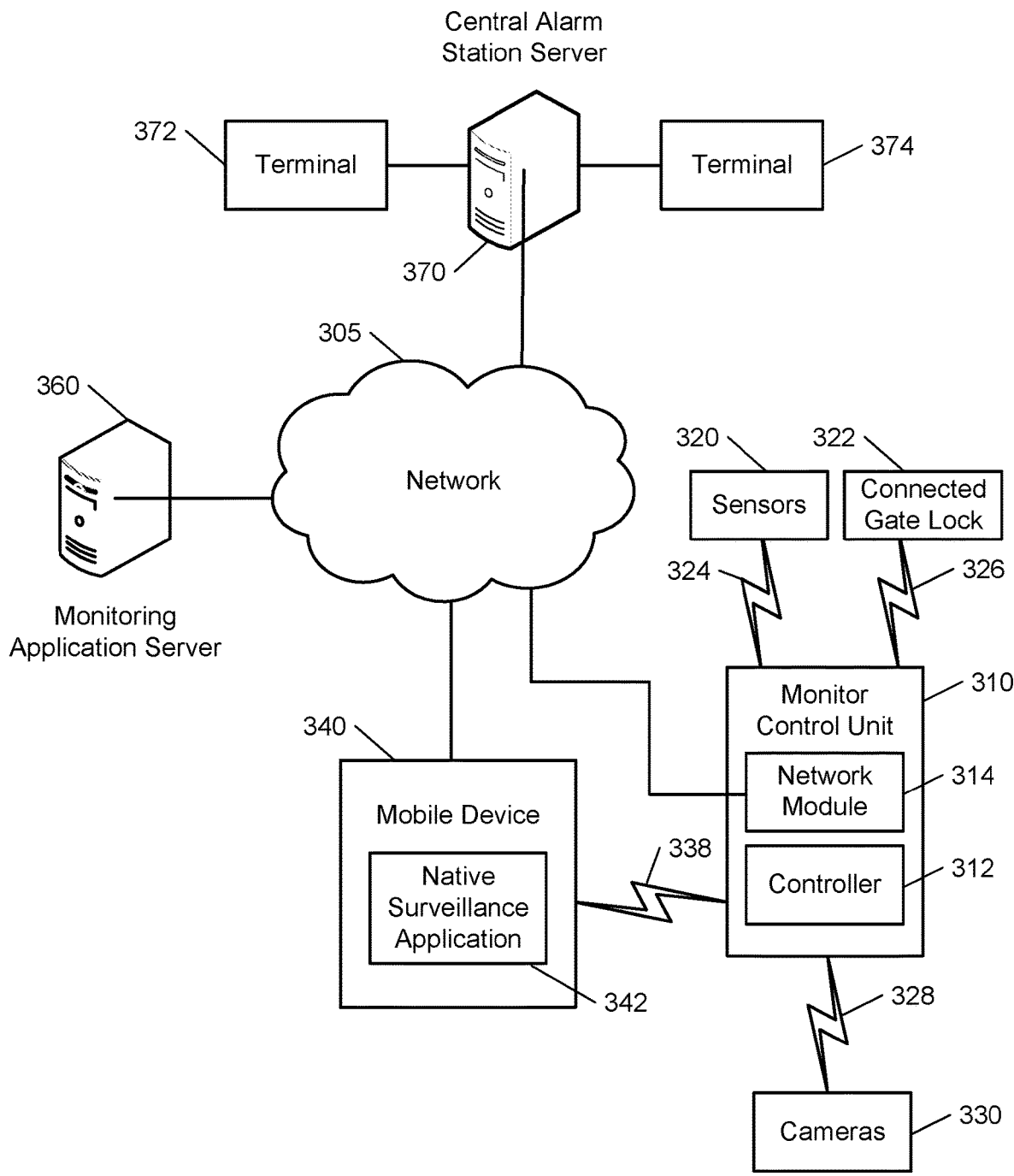
FIG. 3 illustrates another example of a monitoring system with a connected outdoor gate lock.

FIG. 3 illustrates an example of a system 300 configured to monitor a property. The system 300 includes a network 305, a monitor control unit 310, one or more user devices 340, and a monitoring application server 360. The network 305 facilitates communications between the monitor control unit 310, the one or more user devices 340, and the monitoring application server 360. The network 305 is configured to enable exchange of electronic communications between devices connected to the network 305. For example, the network 305 may be configured to enable exchange of electronic communications between the monitor control unit 310, the one or more user devices 340, and the monitoring application server 360. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The monitor control unit 310 includes a controller 312 and a network module 314. The controller 312 is configured to control a monitoring system (e.g., a home alarm or security system) that includes the monitor control unit 310. In some examples, the controller 312 may include a processor or other control circuitry configured to execute instructions of a program that controls operation of an alarm system. In these examples, the controller 312 may be configured to receive input from indoor door knobs, sensors, detectors, or other devices included in the alarm system and control operations of devices included in the alarm system or other household devices (e.g., a thermostat, an appliance, lights, etc.). For example, the controller 312 may be configured to control operation of the network module 314 included in the monitor control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the monitoring control unit 310 to communicate over a local area network and/or the Internet. The network module 314 also may be a voiceband modem configured to enable the alarm panel to communicate over the telephone lines of Plain Old Telephone Systems (POTS).

The monitoring system may include multiple sensors 320. The sensors 320 may include a contact sensor, a motion sensor, a glass break sensor, or any other type of sensor included in an alarm system or security system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The monitoring system may also include one or more other cameras 330. Each of the one or more cameras 330 may be video/photographic cameras or other type of optical sensing device configured to capture images. For instance, the cameras may be configured to capture images of an area within a building monitored by the monitor control unit 310. The cameras may be configured to capture single, static images of the area and also video images of the area in which multiple images of the area are captured at a relatively high frequency (e.g., thirty images per second). The cameras may be controlled based on commands received from the monitor control unit 310.

The cameras may be triggered by several different types of techniques. For instance, a Passive Infra Red (PIR) motion sensor may be built into the cameras and used to trigger the one or more cameras 330 to capture one or more images when motion is detected. The one or more cameras 330 also may include a microwave motion sensor built into the camera and used to trigger the camera to capture one or more images when motion is detected. Each of the one or more cameras 330 may have a "normally open" or "normally closed" digital input that can trigger capture of one or more images when external sensors (e.g., the sensors 320, PIR, door/window, etc.) detect motion or other events. In some implementations, at least one camera 330 receives a command to capture an image when external devices detect motion or another potential alarm event. The camera may receive the command from the controller 312 or directly from one of the sensors 320.

In some examples, the one or more cameras 330 triggers integrated or external illuminators (e.g., Infra Red, Z-wave controlled "white" lights, lights controlled by the module 314, etc.) to improve image quality when the scene is dark. An integrated or separate light sensor may be used to determine if illumination is desired and may result in increased image quality.

The monitoring system may include a connected gate lock 322. The connected gate lock 322 may be, for example, the connected gate lock described in one or more of FIG. 1 and FIGS. 2A-2D.

The sensors 320, the connected gate lock 322, and the cameras 330 communicate with the controller 312 over communication links 324, 326, and 328. The communication links 324, 326, and 328 may be a wired or wireless data pathway configured to transmit signals from the sensors 320, the connected gate lock 322, and the cameras 330 to the controller 312. The communication link 324, 326, and 328 may include a local network, such as, 802.11 "Wi-Fi" wireless Ethernet (e.g., using low-power Wi-Fi chipsets), Z-Wave, Zigbee, Bluetooth, "HomePlug" or other Powerline networks that operate over AC wiring, and a Category 5 (CAT5) or Category 6 (CAT6) wired Ethernet network.

The monitoring application server 360 is an electronic device configured to provide monitoring services by exchanging electronic communications with the monitor control unit 310, and the one or more user devices 340, over the network 305. For example, the monitoring application server 360 may be configured to monitor events (e.g., alarm events) generated by the monitor control unit 310. In this example, the monitoring application server 360 may exchange electronic communications with the network module 314 included in the monitor control unit 310 to receive information regarding events (e.g., alarm events) detected by the monitor control unit 310. The monitoring application server 360 also may receive information regarding events (e.g., alarm events) from the one or more user devices 340.

The one or more user devices 340 are devices that host and display user interfaces. The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a monitoring application 342. The monitoring application 342 refers to a software/firmware program running on the corresponding mobile device that enables the user interface and features described throughout. The user device 340 may load or install the monitoring application 342 based on data received over a network or data received from local media. The monitoring application 342 runs on mobile devices platforms, such as iPhone, iPod touch, Blackberry, Google Android, Windows Mobile, etc. The monitoring application 342 enables the user device 140 to receive and process image and sensor data from the monitoring system.

The central alarm station server 370 is an electronic device configured to provide alarm monitoring service by exchanging communications with the monitor control unit 310, the one or more user devices 340, and the monitoring application server 360 over the network 305. For example, the central alarm station server 370 may be configured to monitor alarm events generated by the monitor control unit 310. In this example, the central alarm station server 370 may exchange communications with the network module 314 included in the monitor control unit 310 to receive information regarding alarm events detected by the monitor control unit 310. The central alarm station server 370 also may receive information regarding alarm events from the one or more user devices 340.

In some implementations, the one or more user devices 340 communicate with and receive monitoring system data from the monitor control unit 310 using the communication link 338. For instance, the one or more user devices 340 may communicate with the monitor control unit 310 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 340 to local security and automation equipment. The one or more user devices 340 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 are shown as communicating with the monitor control unit 310, the one or more user devices 340 may communicate directly with the sensors and other devices controlled by the monitor control unit 310. In some implementations, the one or more user devices 340 replace the monitor control unit 310 and perform the functions of the monitor control unit 310 for local monitoring and long range/offsite communication. Other arrangements and distribution of processing is possible and contemplated within the present disclosure.

Figure 4:
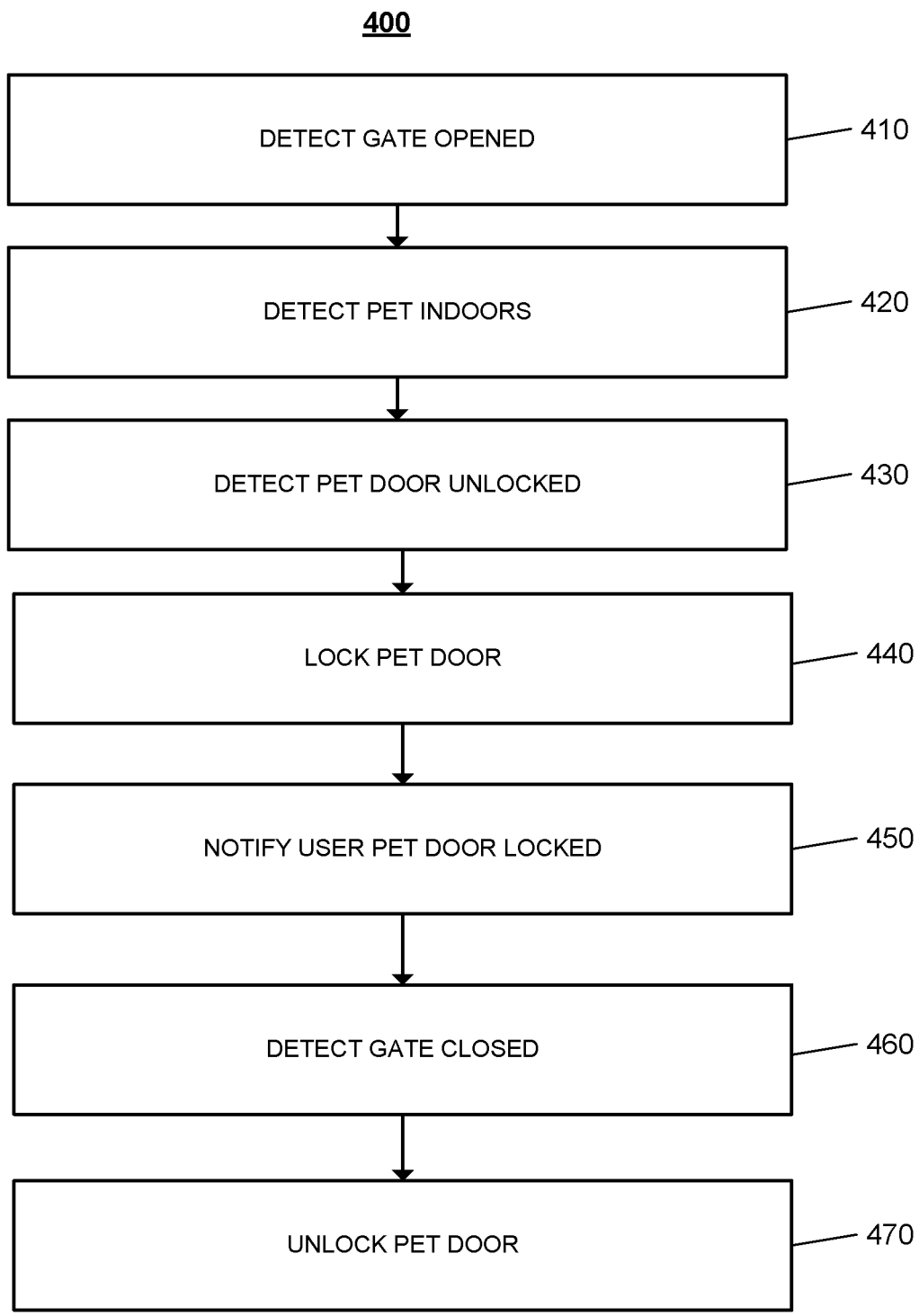
FIG. 4 is a flow chart of an example process for an interaction with a connected gate lock.

FIG. 4 illustrates an example process 400 for an interaction with a connected gate lock. The process 400 includes detecting an outdoor gate lock is opened (410). For example, control unit 112 may receive an indication from the connected outdoor gate lock 104 that the gate that the connected outdoor gate lock 104 is installed on has just been opened. Detecting an outdoor gate lock is opened may be in response to the connected outdoor gate lock 104 detecting that the gate is opened. For example, the connected outdoor gate lock 104 may detect that the gate is opened and, in response, push an indication to the control unit 112 without having the control unit 112 provide a request to the connected outdoor gate lock 104 to indicate whether the gate is open.

The process 400 includes detecting a pet is indoors (420). For example, the control unit 112 may determine that monitoring data from the sensors 110 in a home indicates that a pet is inside a home. The detecting whether a pet is indoors may be in response to detecting the outdoor gate is opened.

Detecting that a pet is indoors may include determining a location of a pet and determining whether the location of the pet is in the building. For example, in response to detecting that the gate is opened, the control unit 112 may use object recognition in images from cameras around a property to detect the pet, determine the location of the pet based on a location shown in the image that the pet is detected in, and then determine whether the location is inside the building. In another example, the control unit 112 may constantly be tracking a pet's location based on a locator beacon in a pet's collar and, in response to detecting that the gate is opened, determine a location of the pet based on the constant tracking of the pet using the locator beacon.

In some implementations, detecting a pet is indoors may include determining that a building has multiple pets, in response to determining that the building has multiple pets, determining whether any pet of the multiple pets is inside the fence and outside the building, and in response to determining that none of the multiple pets is inside the fence and outside the building, locking the pet door. For example, a control unit 112 may store data that indicates all the pets that live at a property and, in response to detecting that the outdoor gate is opened, determine whether any of the pets indicated by the stored data are outside the building and within the fence.

The process 400 includes detecting a pet door is unlocked (430). For example, the control unit 112 may determine that a current status of a pet door 105 in a front door of the home is unlocked so at any time, the pet may exit the home into a fenced outdoor area surrounded by a fence and the gate. The detecting whether the pet door 105 is locked may be in response to detecting the pet is indoors and the outdoor gate is opened. Detecting a pet door is unlocked may include, providing, by the control unit 112 and to the pet door 105, a request for an indication whether the pet door 105 is locked and receiving, by the control unit 112 and from the pet door 105, the indication whether the pet door 105 is locked from the pet door 105.

The process 400 includes locking the pet door (440). For example, the control unit 112 may transmit an instruction to the pet door 105 to lock the pet door 105 so that it can not be opened until the pet door 105 receives an instruction from the control unit 112 to unlock. The locking the pet door 105 may be in response to detecting the pet is indoors and the outdoor gate is opened. Locking the pet door 105 may include providing, by the control unit 112 and to the pet door 105, an instruction to lock the pet door 105.

The process includes notifying a user that the pet door 105 is locked (450). For example, the control unit 112 may transmit an indication to a mobile computing device of a user that the pet door 105 has been locked because the pet is indoors and the connected gate lock indicates that a gate is open. The notifying the user that the pet door 105 is locked may be in response to detecting the pet is indoors and the outdoor gate is opened The process includes detecting a gate is closed (460). For example, the control unit 112 may receive an indication from the connected gate lock that the gate has been closed after the control unit 112 locked the pet door in response to determining that a pet is in a home and the gate was opened.

The process includes unlocking a pet door (470). The unlocking of the pet door 105 may be in response to detecting the pet door 105 is locked and the outdoor gate is now closed.

While the process 400 is described in regards to securing pets with pet doors and a gate, an implementation may also be used for securing humans with building entrance doors and a gate. For example, a young child, someone with autism, or someone with Alzheimer's may be similarly kept within a gated area. Accordingly, a similar process may include detecting an outdoor gate lock is opened, detecting a particular person, e.g., young child, person with Alzheimer, etc., is indoors, detecting that a front door of a building is unlocked, in response locking the front door of the building, and notifying a user that the front door of the building is now locked.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   detecting, by a control unit in a building and of a monitoring system, that a gate of a fence that encloses the building has opened;
   in response to detecting, by the control unit, that the gate of the fence that encloses the building has opened, determining, by the control unit, whether (i) a pet is in the building and (ii) a pet door of the building is unlocked;
   in response to determining (i) that the pet is in the building and (ii) that the pet door of the building is unlocked, locking, by the control unit, the pet door of the building;
   detecting that the gate has closed after the pet door was locked in response to determining (i) that the pet is in the building and (ii) that the pet door of the building is unlocked; and
   in response to detecting that the gate has closed after the pet door was locked in response to determining (i) that the pet is in the building and (ii) that the pet door of the building is unlocked, unlocking the pet door.

2. The method of claim 1, wherein detecting that a gate of a fence that encloses a building has opened comprises:
   receiving, at the control unit and from an outdoor gate lock, an indication that the outdoor gate lock detected that the gate was opened.

3. The method of claim 1, wherein in response to detecting that the gate of the fence that encloses the building has opened, determining whether (i) a pet is in the building and (ii) a pet door of the building is unlocked comprises:
   determining a location of the pet; and
   determining whether the location of the pet is in the building.

4. The method of claim 1, wherein in response to detecting that the gate of the fence that encloses the building has opened, determining whether (i) a pet is in the building and (ii) a pet door of the building is unlocked comprises:
   providing, by the control unit and to the pet door, a request for an indication whether the pet door is locked; and
   receiving, by the control unit and from the pet door, the indication whether the pet door is locked.

5. The method of claim 1, wherein in response to determining (i) that the pet is in the building and (ii) that the pet door of the building is unlocked, locking the pet door of the building comprises:
   providing, by the control unit and to the pet door, an instruction to lock the pet door.

6. The method of claim 1, comprising:
   providing a notification to a user that the pet door of the building has been locked.

7. The method of claim 1, wherein determining whether (i) a pet is in the building and (ii) a pet door of the building is unlocked comprises:
   determining that the building has multiple pets;
   in response to determining that the building has multiple pets, determining whether any pet of the multiple pets is inside the fence and outside the building; and
   in response to determining that none of the multiple pets is inside the fence and outside the building, locking the pet door.

8. A system comprising:
   one or more computers and one or more storage devices storing instructions that are operable, when executed by the one or more computers, to cause the one or more computers to perform operations comprising:
   detecting, by a control unit in a building and of a monitoring system, that a gate of a fence that encloses the building has opened;
   in response to detecting, by the control unit, that the gate of the fence that encloses the building has opened, determining, by the control unit, whether (i) a pet is in the building and (ii) a pet door of the building is unlocked;
   in response to determining (i) that the pet is in the building and (ii) that the pet door of the building is unlocked, locking, by the control unit, the pet door of the building;
   detecting that the gate has closed after the pet door was locked in response to determining (i) that the pet is in the building and (ii) that the pet door of the building is unlocked; and
   in response to detecting that the gate has closed after the pet door was locked in response to determining (i) that the pet is in the building and (ii) that the pet door of the building is unlocked, unlocking the pet door.

9. The system of claim 8, wherein detecting that a gate of a fence that encloses a building has opened comprises:
receiving, at the control unit and from an outdoor gate lock, an indication that the outdoor gate lock detected that the gate was opened.

10. The system of claim 8, wherein in response to detecting that the gate of the fence that encloses the building has opened, determining whether (i) a pet is in the building and (ii) a pet door of the building is unlocked comprises:
determining a location of the pet; and
determining whether the location of the pet is in the building.

11. The system of claim 8, wherein in response to detecting that the gate of the fence that encloses the building has opened, determining whether (i) a pet is in the building and (ii) a pet door of the building is unlocked comprises:
providing, by the control unit and to the pet door, a request for an indication whether the pet door is locked; and
receiving, by the control unit and from the pet door, the indication whether the pet door is locked.

12. The system of claim 8, wherein in response to determining (i) that the pet is in the building and (ii) that the pet door of the building is unlocked, locking the pet door of the building comprises:
providing, by the control unit and to the pet door, an instruction to lock the pet door.

13. The system of claim 8, the operations comprising:
providing a notification to a user that the pet door of the building has been locked.

14. The system of claim 8, wherein determining whether (i) a pet is in the building and (ii) a pet door of the building is unlocked comprises:
determining that the building has multiple pets;
in response to determining that the building has multiple pets, determining whether any pet of the multiple pets is inside the fence and outside the building; and
in response to determining that none of the multiple pets is inside the fence and outside the building, locking the pet door.

15. A non-transitory computer-readable medium storing software comprising instructions executable by one or more computers which, upon such execution, cause the one or more computers to perform operations comprising:
detecting, by a control unit in a building and of a monitoring system, that a gate of a fence that encloses the building has opened;
in response to detecting, by the control unit, that the gate of the fence that encloses the building has opened, determining, by the control unit, whether (i) a pet is in the building and (ii) a pet door of the building is unlocked;
in response to determining (i) that the pet is in the building and (ii) that the pet door of the building is unlocked, locking, by the control unit, the pet door of the building;
detecting that the gate has closed after the pet door was locked in response to determining (i) that the pet is in the building and (ii) that the pet door of the building is unlocked; and
in response to detecting that the gate has closed after the pet door was locked in response to determining (i) that the pet is in the building and (ii) that the pet door of the building is unlocked, unlocking the pet door.

16. The medium of claim 15, wherein detecting that a gate of a fence that encloses a building has opened comprises:
receiving, at the control unit and from an outdoor gate lock, an indication that the outdoor gate lock detected that the gate was opened.

17. The medium of claim 15, wherein in response to detecting that the gate of the fence that encloses the building has opened, determining whether (i) a pet is in the building and (ii) a pet door of the building is unlocked comprises:
determining a location of the pet; and
determining whether the location of the pet is in the building.

18. The medium of claim 15, wherein in response to detecting that the gate of the fence that encloses the building has opened, determining whether (i) a pet is in the building and (ii) a pet door of the building is unlocked comprises:
providing, by the control unit and to the pet door, a request for an indication whether the pet door is locked; and
receiving, by the control unit and from the pet door, the indication whether the pet door is locked.

* * * * *